United States Patent [19]
Umetsu et al.

[11] Patent Number: 5,192,560
[45] Date of Patent: Mar. 9, 1993

[54] VARIABLE MOLD APPARATUS

[75] Inventors: Sachio Umetsu; Toshihiko Miura, both of Kawasaki, Japan

[73] Assignee: Canon Kabushiki Kaisha, Tokyo, Japan

[21] Appl. No.: 834,978

[22] Filed: Feb. 13, 1992

Related U.S. Application Data

[63] Continuation of Ser. No. 489,357, Mar. 6, 1990, abandoned.

[30] Foreign Application Priority Data

| Mar. 7, 1989 | [JP] | Japan | 1-052906 |
| Mar. 7, 1989 | [JP] | Japan | 1-052907 |
| May 16, 1989 | [JP] | Japan | 1-120421 |

[51] Int. Cl.⁵ ............................................... B28B 7/02
[52] U.S. Cl. ........................................ 425/175; 249/155;
      249/161; 425/356; 425/395; 425/398; 425/408
[58] Field of Search ............... 425/390, 394, 398, 175,
      425/356, 406, 395, 408; 249/155, 158, 161;
      901/16

[56] References Cited

U.S. PATENT DOCUMENTS

| 2,499,980 | 3/1950 | Stokes, Jr. et al. | 425/356 |
| 2,881,486 | 4/1959 | Soref | 425/175 |
| 3,166,617 | 1/1965 | Munk | 249/109 |
| 3,596,869 | 8/1971 | Humphrey | 249/155 |
| 4,390,491 | 6/1983 | Woodall | 425/175 |
| 4,412,799 | 11/1983 | Gates | 249/155 |
| 4,482,307 | 11/1984 | Schaidl et al. | 425/356 |
| 4,571,149 | 2/1986 | Soroka et al. | 901/13 |
| 4,648,934 | 3/1987 | Kiss | 425/398 |
| 4,781,517 | 11/1988 | Pearce et al. | 901/16 |
| 4,792,112 | 12/1988 | Corby et al. | 425/394 |
| 4,797,082 | 1/1989 | Hughes | 425/412 |
| 4,863,206 | 9/1989 | Kaufmann | 901/16 |
| 4,890,235 | 12/1989 | Reger et al. | 264/313 |
| 4,932,852 | 6/1990 | Suzuki | 425/2 |

FOREIGN PATENT DOCUMENTS

| 60-48855 | 3/1985 | Japan |  |
| 60-71414 | 4/1985 | Japan |  |
| 87/07233 | 12/1987 | PCT Int'l Appl. | 425/394 |
| 1425312 | 2/1976 | United Kingdom | 249/155 |

*Primary Examiner*—Jay H. Woo
*Assistant Examiner*—Robert B. Davis
*Attorney, Agent, or Firm*—Fitzpatrick, Cella, Harper & Scinto

[57] ABSTRACT

This invention relates to an article supplying tape formed with recess for containing articles therein in a tape-like or plate-like member, and supplying the articles to an automatic assembling machine or a working machine by the tape member, and the specification discloses a mold apparatus for forming the article containing recess in the tape, and particularly a mold apparatus for forming the shape of the recess variably in conformity with the shapes of the articles to be contained therein.

9 Claims, 12 Drawing Sheets

FIG.3A
FIG.3B
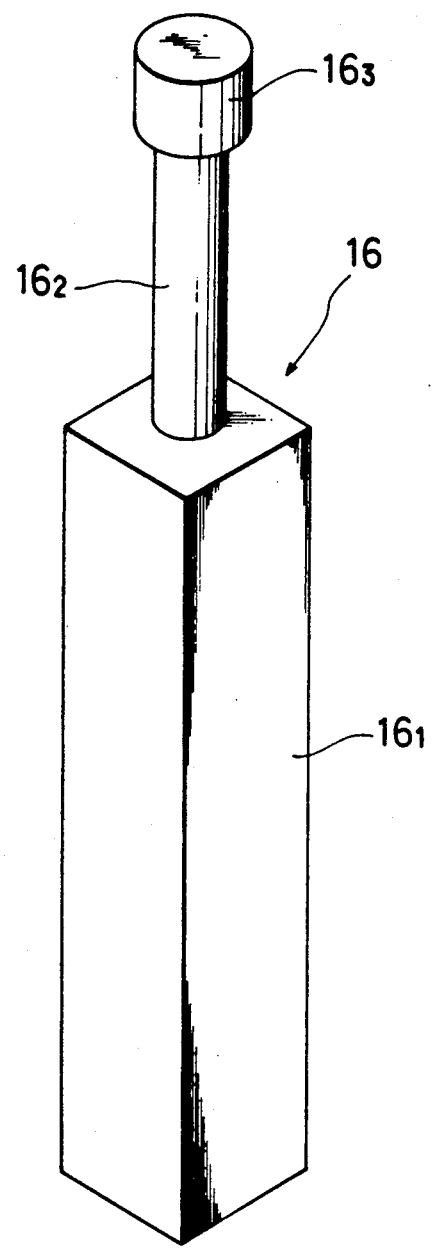
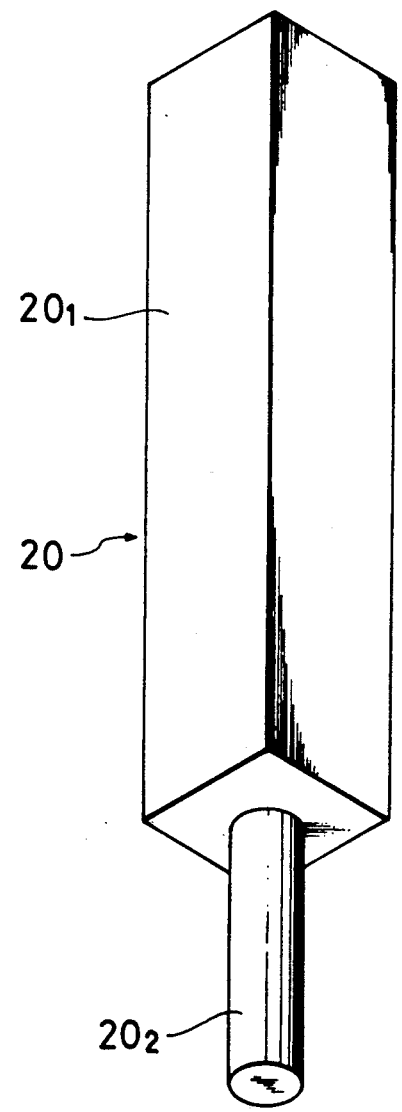

VARIABLE MOLD APPARATUS

This application is a continuation of application Ser. No. 07/489,357 filed Mar. 6, 1990, now abandoned.

BACKGROUND OF THE INVENTION

1. Field of the Invention

This invention relates to a variable mold apparatus for molding a plate-like member so as to have a recess of a predetermined shape, or a variable mold apparatus for punching a plate-like member so as to have a predetermined punched shape.

2. Related Background Art

As an apparatus for supplying articles to an automatic machine such as a robot for working or assembling the articles, there is an article supplying apparatus shown in Japanese Laid-Open Patent Application No. 60-48855. This article supplying apparatus is an apparatus wherein the articles to be supplied are nipped between two belts in advance. In FIG. 1 of Japanese Laid-Open Patent Application No. 60-71414, there is shown article conveying film A which is formed with an article containing recess and supplies articles with the articles being contained in said recess and covered with a cover tape A2.

When as previously described, a recess for containing articles therein is to be formed in a tape-like article supplying member and as shown in FIG. 13 of the accompanying drawings, a drawing process is applied to make a workpiece f having a recess, use is made of a mold apparatus having a mold worked into a required mold shape, as shown in FIG. 14 of the accompanying drawings. In FIG. 14, the reference character a designates an upper mold, the reference character b denotes a lower mold, the reference character c designates a die set, and the reference character d denotes a stripper plate.

In the prior-art mold apparatus constructed as described above, there must be provided an upper mold and a lower mold in conformity with the mold shape of a workpiece, and it has been pointed out that where there are many kinds of the mold shape, the working cost of the mold is high and a long working time is required.

Particularly in the recent circumstances wherein the production time for products has become short and along therewith, the development period for new products must be shortened, the increased cost of products may result from the former and an unrecoverable delay in starting the production of new products may result from the latter.

SUMMARY OF THE INVENTION

The present invention has been made in view of the above-noted problems and an object thereof is to provide a variable mold apparatus which is inexpensive and moreover can shorten the working time.

The present invention further proposes a variable mold apparatus in which a tape member is formed with recesses in a row and a containing portion of any shape, for example, a shape corresponding to the shape of articles, is formed in the tape member containing the articles in said recesses.

Particularly in connection with the above object, the present invention proposes a variable mold apparatus which is also applicable to a case where containing portions differing in shape (so as to cope with the task of irregularly supplying articles to be contained by a tape member) are provided on a tape member.

BRIEF DESCRIPTION OF THE DRAWINGS

FIGS. 1 to 8 show a first embodiment of the present invention, FIG. 1 being an exploded perspective view showing the construction of the first embodiment of a variable mold apparatus according to the present invention, FIG. 2 being a top plan view showing the fastened state by fixing guides, FIGS. 3A and 3B being perspective views showing the shapes of the die members of an upper mold and a lower mold, respectively, FIG. 4 being a perspective view showing the shape of an arrangement plate for the upper mold, FIG. 5 being a perspective view showing the shape of an arrangement plate for the lower mold, FIG. 6A being a front view showing the mounted states of the upper and lower molds mounted on a jig for controlling the amount of protrusion, before the amount of protrusion is controlled, FIG. 6B showing the construction of a brade system, FIG. 7 being a front cross-sectional view schematically showing the construction of a process die set on which the variable mold apparatus shown in FIG. 1 is mounted, and FIG. 8 being an exploded perspective view showing a state in which the variable mold apparatus shown in FIG. 1 is used as a punching mold.

DESCRIPTION OF THE PREFERRED EMBODIMENTS

The construction of a first embodiement of a variable mold apparatus according to the present invention will hereinafter be described in detail with respect to a case where it is applied to a shaping mold apparatus, with reference to FIGS. 1 to 7 of the accompanying drawings.

Figure 1:
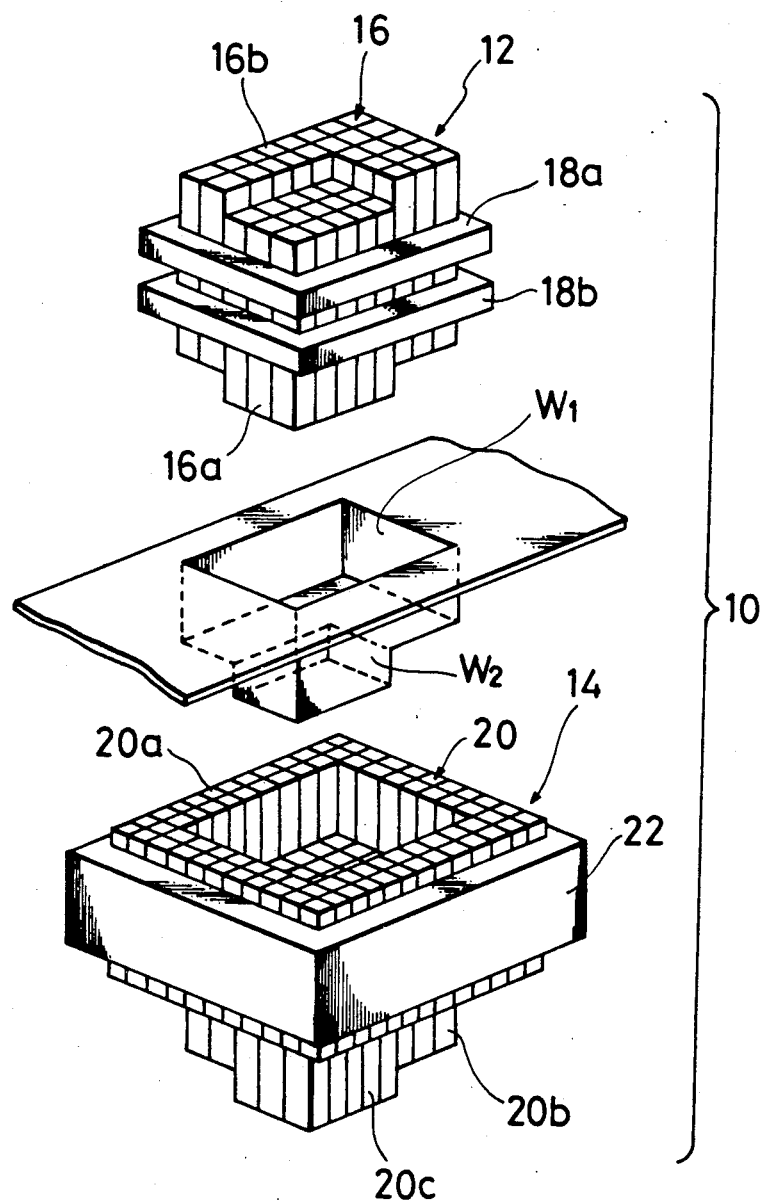

This shaping mold apparatus 10 is an apparatus for draw-working a tape member of a material such as a metal or plastic resin, and is provided with an upper mold 12 and a lower mold 14 as shown in FIG. 1. This molding apparatus 10 is designed to draw-work a workpiece designated by the reference character W so as to have a deeply drawn portion for containing articles in a flat plate-like or tape-like article containing member. In this embodiment, the shape of the draw-worked workpiece is set so as to have a rectangular first recess W1 formed directly in the surface of the article containing member and a second recess W2 formed so as to be further depressed from a portion of the first recess W1, as shown by the workpiece W.

On the other hand, the upper mold 12 is provided with a plurality of rod-like die members 16, and adjacent ones of these die members 16 are slidable relative to each other and capable of protruding. In this embodiment, some corresponding die members 16a are protruded downwardly to define the second recess W2, and the remaining die members 16b are so set as to directly define the first recess W1. In a state in which said some die members 16a are protruded, these die members are set so that they are generally fastened by a pair of fixing guides 18a and 18b for the upper mold and have their protruded shape fixed thereby.

Also, the lower mold 14, like the upper mold 12, is provided with a plurality of rod-like die members 20, and adjacent ones of these die members 20 are slidable relative to each other and capable of protruding. In this embodiment, each die member 20 is comprised of a die member 20a as a base end portion having an upper surface wider than the upper mold 12, a die member 20b downwardly protruded correspondingly to the remaining die members 16b of the upper mold 12, and a die member 20c further downwardly protruded from the die member 20b correspondingly to said some die members 16a of the upper mold 12.

Also, these die members 20 are set so that in their partly protruded state as shown, they are generally fastened by a fixing guide 22 for the lower mold and have their protruded shape fixed.

Figure 2:
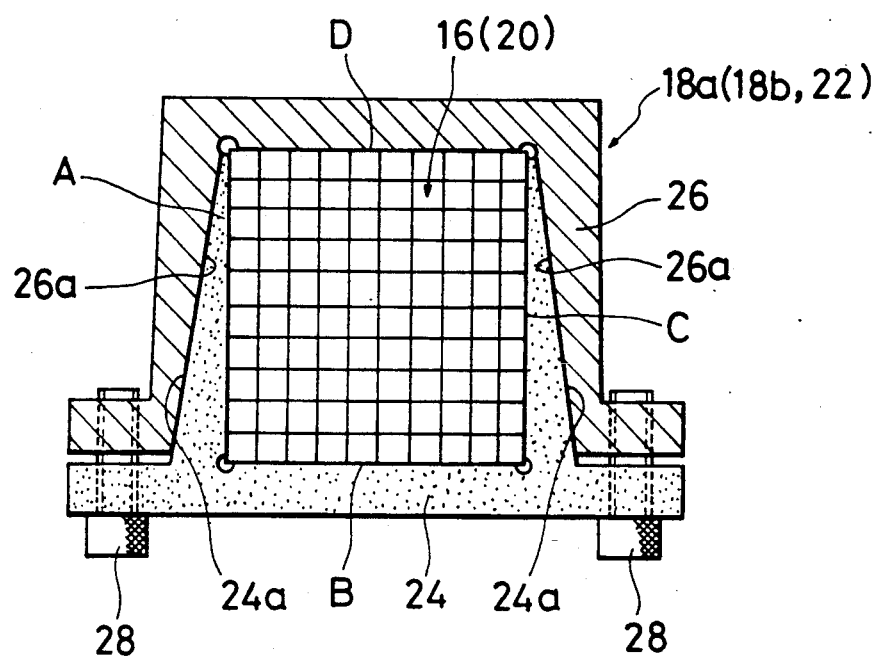

The fixing guides 18a, 18b for the upper mold and the fixing guide 22 for the lower mold each, as typically shown in FIG. 2, are provided with a first fastening member 24 formed so as to surround the three sides A, B and C of the corresponding die members 16 or 20, a second fastening member 26 formed so as to surround the remaining side D and the both end sides of the first fastening member 24, and fastening bolts 28 as biasing members for drawing the first and second fastening members 24 and 26 toward each other.

The outer surface of the first fastening member 24 at the both end sides thereof and the inner surface of the second fastening member 26 at the both end sides thereof slidably contact with each other, and the outer surface and the inner surface are comprised of a tapered surface 24a and a tapered surface 26a, respectively, and these tapered surfaces 24a and 26a are set so as to be biased inwardly by being brought close to each other.

In this manner, the first and second fastening members 24 and 26 are fastened toward each other through the fastening bolts 28, whereby the side B of the die members 16 or 20 against which the middle side of the first fastening member 24 bears and the side D of the die members 16 or 20 against which the middle side of the second fastening member 26 bears are biased in a direction of compression. Also, by the first and second fastening members 24 and 26 being brought close to each other, both end sides of the first fastening member 24 are biased toward the remaining opposed sides A and C of the die members 16 or 20 in a direction of compression through the above-described tapered surfaces 24a and 26a. As a result, the die members 16 or 20 are generally fastened from the surroundings thereof and thus, their aggregated state, i.e., their protruded state, is held in a fixed state.

Figure 4:
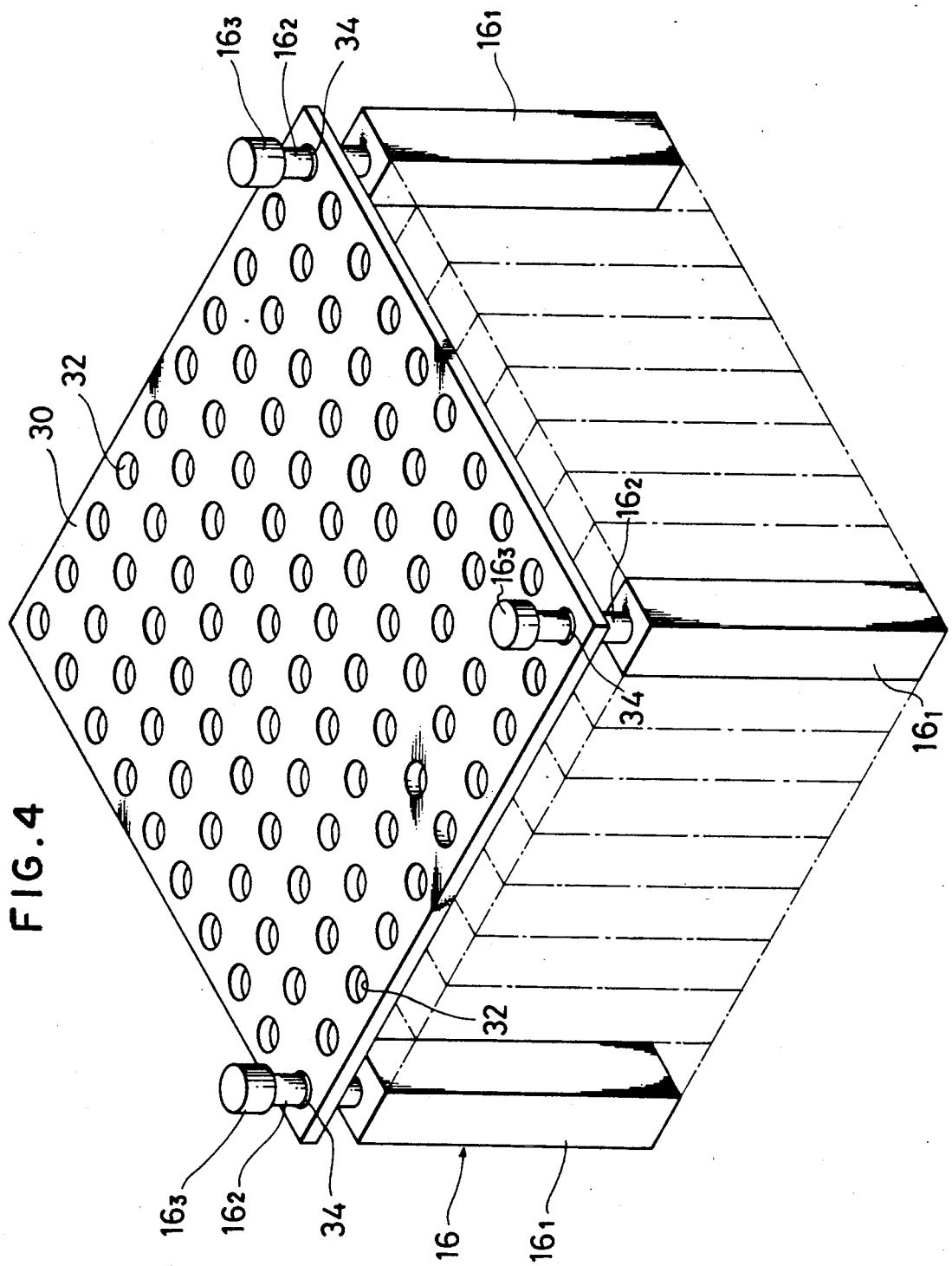

Each die member 16 of the upper mold 12, as shown in FIG. 3A, is comprised of a lower die body $16_1$ directly concerned in the drawing work, a connection rod $16_2$ integrally connected to the top of the die body $16_1$ and formed with a smaller diameter than the die body $16_1$, and a head $16_3$ of a large diameter formed on the upper end of the connection rod $16_2$. These die members 16, as shown in FIG. 4, are mounted so as to be arranged in a predetermined matrix through an arrangement plate 30. That is, this arrangement plate 30 is formed with through-apertures 32 correspondingly to the arrangement locations of the respective die members 16, and the connection rods $16_2$ of the corresponding die members 16 are inserted in respective through-apertures 32.

The size of each through-aperture 32 is slightly larger than the cross-sectional shape of the connection rod $16_2$. A friction ring 34 formed of a resilient material is fitted to the inner periphery of each through-aperture 32, and the inner diameter of each friction ring 34 is slightly smaller than the outer diamter of the connection rod $16_2$.

Thus, the die members 16 are suspended in frictional engagement with the arrangement plate 30 through the friction rings 34. Accordingly, even if the fixing guides 18a and 18b for the upper mold are loosened to depress the corresponding die members $16_a$ downwardly through a protrusion amount control mechanism 36 which will be described later in order to define the recess in the drawing work, each die members 16 will be restrained in that position. Also, in the state in which the fixing guides 18a and 18b for the upper mold are loosened, each die member 16 is singly downwardly depressible against the frictional force of the corresponding friction ring 34.

Figure 5:
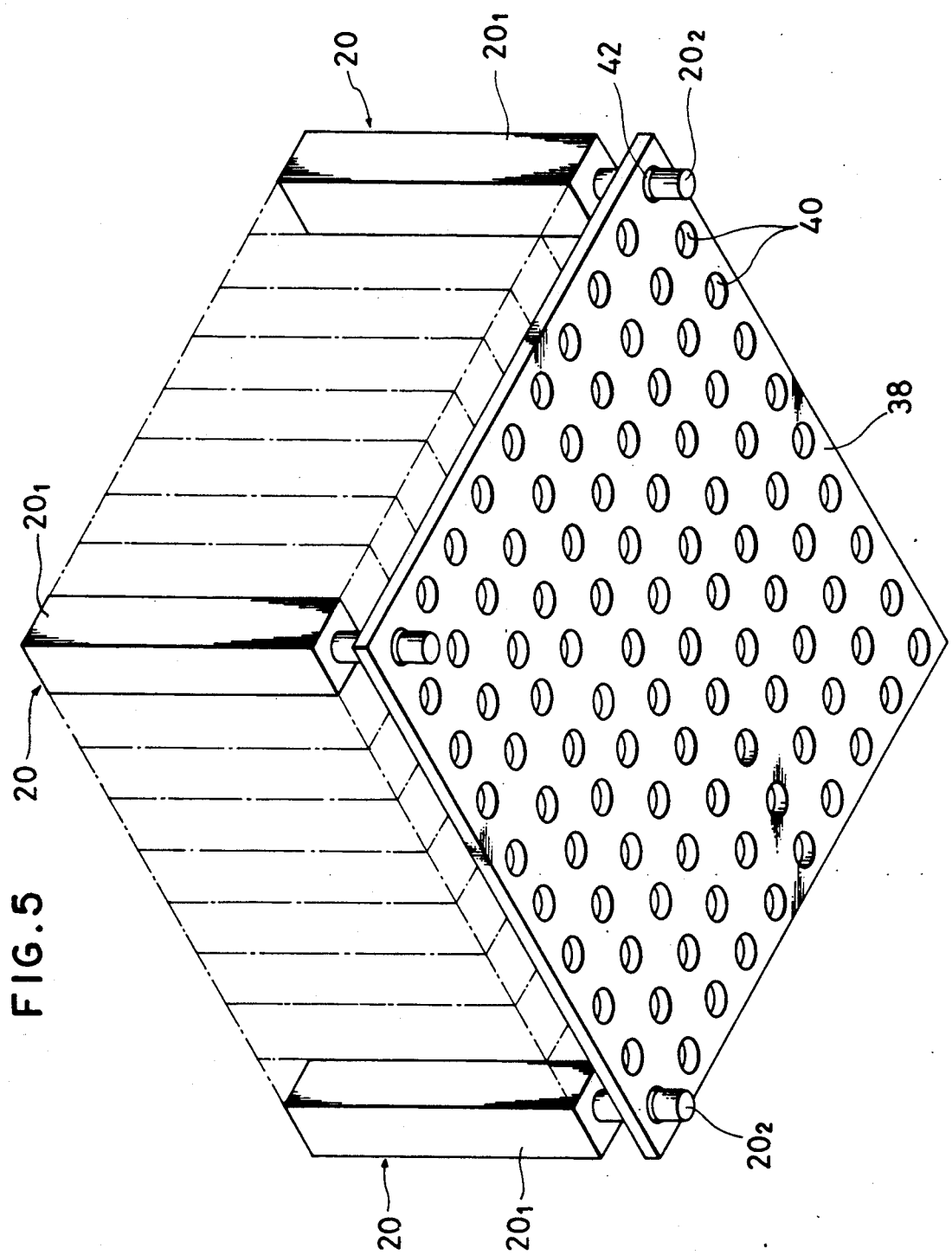

On the other hand, each die member 20 of the lower mold 14, as shown in FIG. 3B, is comprised of an upper die body $20_1$ directly concerned in the drawing work, and a connection rod $20_2$ integrally connected to the lower end of the die body $20_1$ and formed with a smaller diameter than the die body $20_1$. These die members 20 are mounted so as to be arranged in a predetermined matrix through an arrangement plate 38 formed like the arrangement plate 30 for the upper mold 12, as shown in FIG. 5. That is, this arrangement plate 38 is formed with through-apertures 40 correspondingly to the arrangement positions of the die members 20, and the connection rod $20_2$ of the corresponding die member 20 is inserted in each through-aperture 40.

The size of each through-aperture 40 is slightly larger than the cross-sectional shape of the connection rod $20_2$. A friction ring 42 formed of a resilient material is fitted to the inner periphery of each through-aperture 40, and the inner diameter of each friction ring is slightly smaller than the outer diameter of the connection rod $20_2$.

Thus, the die members 20 are suspended in frictional engagement with the arrangement plate 38 through the friction rings 42. Accordingly, even if the fixing guide 20 for the lower mold is loosened to depress the correspondingly die members 20a downwardly through a protrusion control mechanism 36 which will be described later in order to define the recess in the drawing work, each die member 20 will be restrained in that position. Also, in the state in which the fixing guide 10 for the lower mold is loosened, each die member 20 is singly downwardly depressible against the frictional force of the corresponding friction ring 42.

The construction and protrusion amount controlling operation of the protrusion amount control mechanism 36 will now be described with reference to FIGS. 6A and 6B.

Figure 6A:
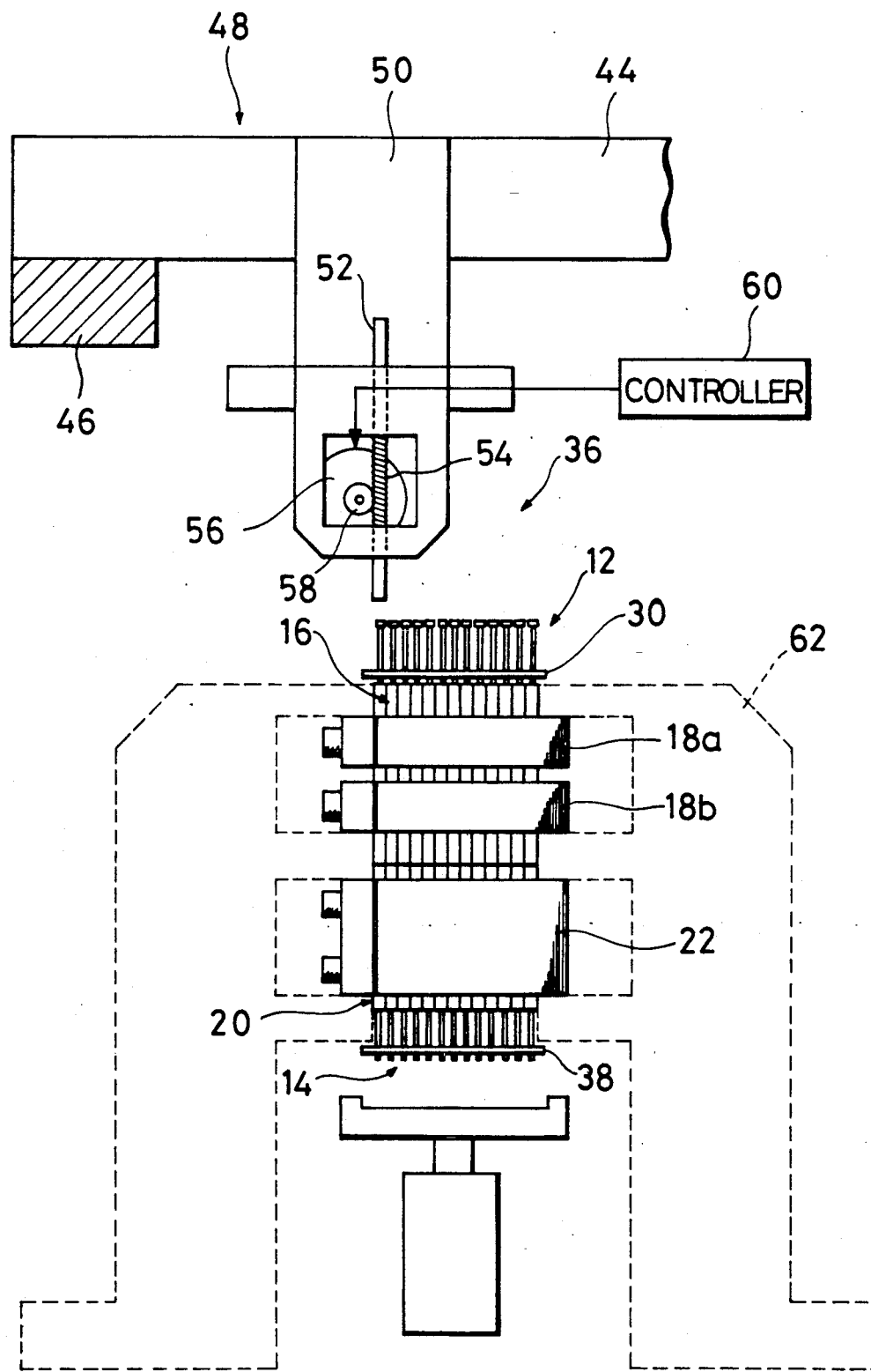
Figure 6B:
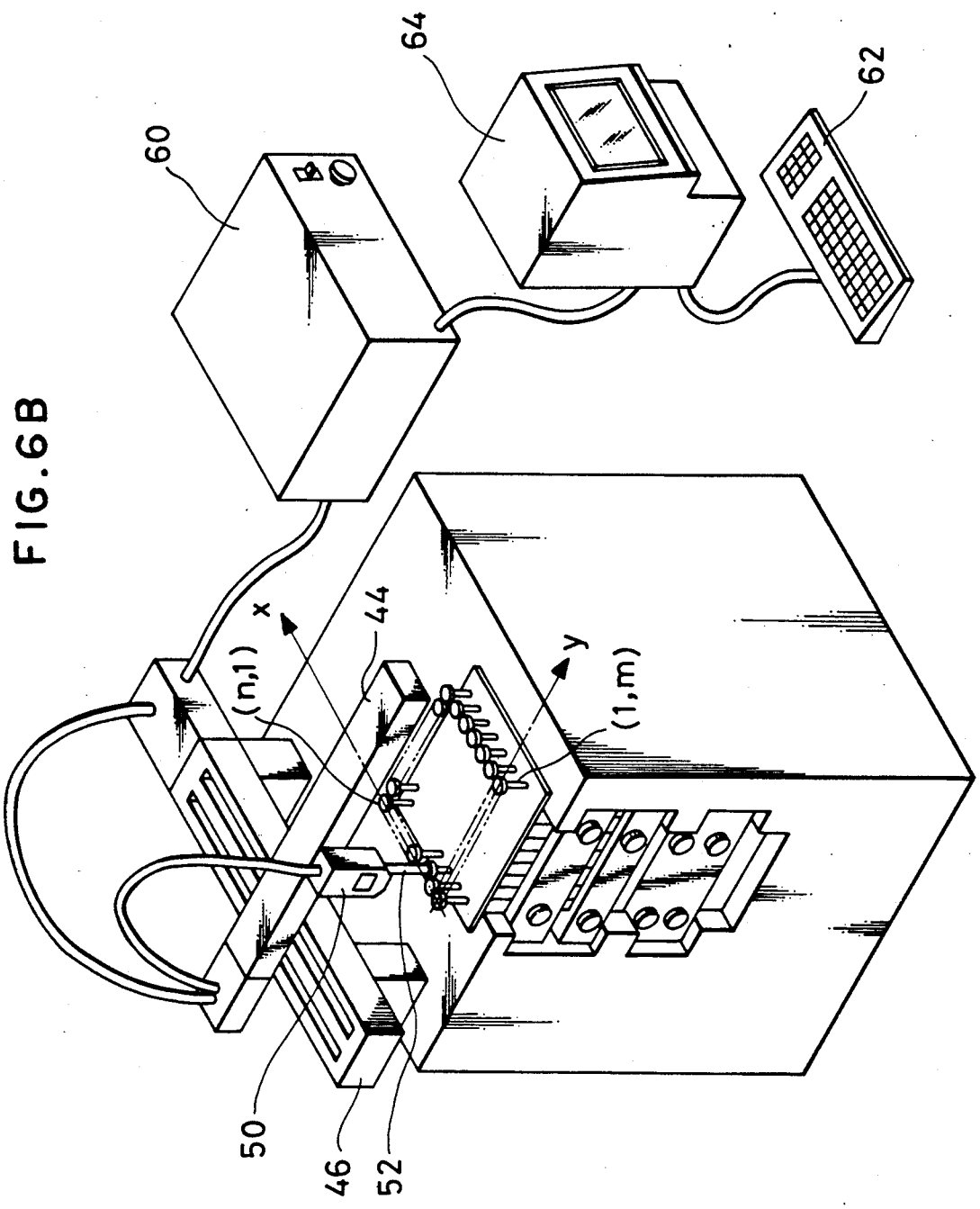

This protrusion amount control mechanism 36, as shown in FIGS. 6A and 6B, is provided with a robot 48 having an x-axis arm 44 movable along the y-axis. The x-axis arm 44 and the y-axis arm 46 are designated to be moved along the directions of the x-axis and the y-axis, respectively, by a driving mechanism shown in FIG. 6B. Also, a protruded rod 52 is mounted for movement along the direction of the z-axis (i.e., along vertical direction) on the fore end of the x-axis arm 44 through a mounting stay 50. This protruded rod 52 is formed with a rack 54, and a drive motor 56 is disposed within the mounting stay 50, and a pinion 58 meshing with the rack 54 is coaxially fixed to the driving shaft of the drive motor 56.

The lower end of the protruded rod 52 is set to such a size that it can engage the head $16_3$ of each die member 16 from above. Also, the driving mechanism for the x-axis arm 44, the driving mechanism for the y-axis arm 46 and the drive motor 56 for the protruded rod 52 are all connected to a controller 60 for prescribing the amounts of movement thereof, and are adapted to move (protrude) on the basis of the instructions from the controller 60.

That is, the controller 60 is designated to prescribe by what amount of protrusion the die member 16 in which planar position protrudes downwardly, on the basis of the shape information of the recess in the drawing work input through an input mechanism 62.

In this controller 60, setting is made such that in a group of die members 16 which have been determine to protrude, the coordinates positions in the x-y coordinates are prescribed in a predetermined sequence, for example, in such a manner that first, with respect to the small values of the x coordinates, the y coordinates are varied in succession from a smaller value toward a greater value to thereby prescribe the coordinates positions successively and when the value of the y coordinates in the x coordinates becomes greatest, the value of the x coordinates is changed to the next greatest value and as done previously, with respect to the x coordinates, the y coordinates are varied in succession from a smaller value toward a greater value to thereby prescribe the coordinates positions successively.

The operation of forming the upper mold 12 and the lower mold 14 by the protrusion amount control mechanism 36 constructed as described above will now be described with reference to FIG. 6A.

First, prior to starting the protrusion amount control mechanism 36, the upper mold 12 is not partly protruded but is mounted on a protrusion amount prescribing jig 62 in a state in which the upper mold 12 and lower mold 14 fastened through the corresponding fixing guides 18a, 18b and 22 are stacked in intimate contact with each other, and the arrangement plate 30 is mounted on the die members 16 of the upper mold 12, that is, the connection rod $16_2$ of each die member 16 is inserted into the corresponding through-aperture 32 through the friction ring 34. On the other hand, the arrangement plate 38 is mounted on the die members 20 of the lower mold 14, that is, the connection rod $20_2$ of each die member 20 is inserted into the corresponding through-aperture 40 through the friction ring 42.

Thereafter, the respective fixing guides 18a, 18b and 22 are loosened to thereby render the die members 16 downwardly depressible. Here, as described above, the upper mold 12 and lower mold 14 are stacked in intimate contact with each other and therefore, when the die members 16 of the upper mold 12 are downwardly depressed, the die members 20 of the lower mold 14 which correspond thereto are likewise downwardly depressed by the same amount.

From this state, the controller 60 is started, and the protruded rod 52 is first moved to right above the die member 16a at the first coordinates position conforming to the above-described sequence, in the x-y plane, whereafter the drive motor 56 is driven to accomplish the protrusion of this die member 16a, whereby the protruded rod 52 is downwardly depressed. After in response to this depression of the protruded rod 52, the lower end thereof bears against the head $16_3$ of the corresponding die member 16a from above, the die members 16 and 20 corresponding to each other are integrally protruded downwardly against the frictional force on the friction rings 34 and 42.

After it is detected that the amounts of protrusion of the die members 16 and 20 have reached predetermined values or after the predetermined revolution of the motor, the controller 60 stops driving the drive motor 56, whereafter it drives the drive motor 56 in the reverse direction to thereby raise the protruded rod 52 to the standby position above the arrangement plate 30. Thereafter, in accordance with the above-described sequence, the y-axis arm 46 is moved to protrude the die member 16 at the next coordinates position downwardly, and the protruded rod 52 is moved on the x-y plane and brought to right above the next die member 16, and the above-described protruding operation is executed repetitively.

When in this manner, the die members 16a lying at the coordinates positions to be protruded are all protruded downwardly, a series of protrusion amount prescribing operations in the protrusion amount control mechanism 36 are completed, and the x-axis arm 44, the y-axis arm 46 and the protruded rod 52 are returned to their respective initial positions.

Thereafter, the fixing guides 18a, 18b for the upper mold and the fixing guide 22 for the lower mold are tensioned, whereby the upper mold 12 and lower mold 14 are fixed in a state in which predetermined ones of the die members 16a and 20a are protruded downwardly, and a series of working and deforming operations for the upper mold 12 and lower mold 14 are terminated.

Thus, the upper mold 12 and lower mold 14 are worked and deformed, and in this embodiment, setting is made so that a depressed shape having two stages of recesses $W_1$ and $W_2$ may be draw-worked, but it becomes possible to change and set the depressed shape to any depressed shape, and it becomes possible to cope with a variety of shapes by this pair of upper mold 12 and lower mold 14.

As a result, in this embodiment, the mold shaping cost may be low and the time for designing and making the mold is shortened and thus, a situation in which the preparation of the mold is not in time for the manufacture of products is reliably avoided.

Figure 7:
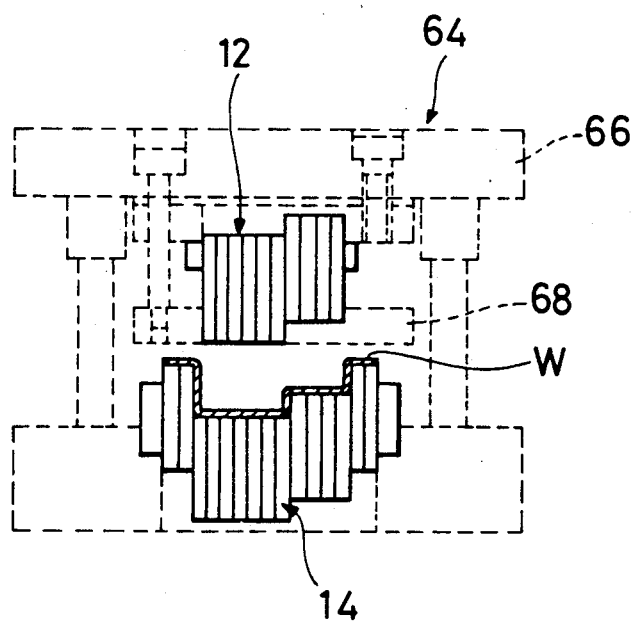

The thus worked and deformed upper mold 12 and lower mold 14 are mounted on a press die set 64 shown in FIG. 7, thereby being used for the shaping operation.

That is, this press die set 64 is constructed of a die set 66 and a stripper plate 68.

Thus, when effecting the drawing work in this press die set 64, a planar metal plate W is inserted between the upper mold 12 and the lower mold 14, and is fixed to the upper surface of the lower mold 14 by fixing means, not shown. By applying a downwardly directed load to the upper mold 12 by a drive source, not shown, the upper mold works and the metal plate W as a workpiece is draw-worked. FIG. 7 shows the state at a point of time whereat the drawing work has been terminated.

The present invention is not restricted to the construction of the above-described embodiment, but of course may be modified variously within a scope which does not depart from the gist of the present invention.

Figure 8:
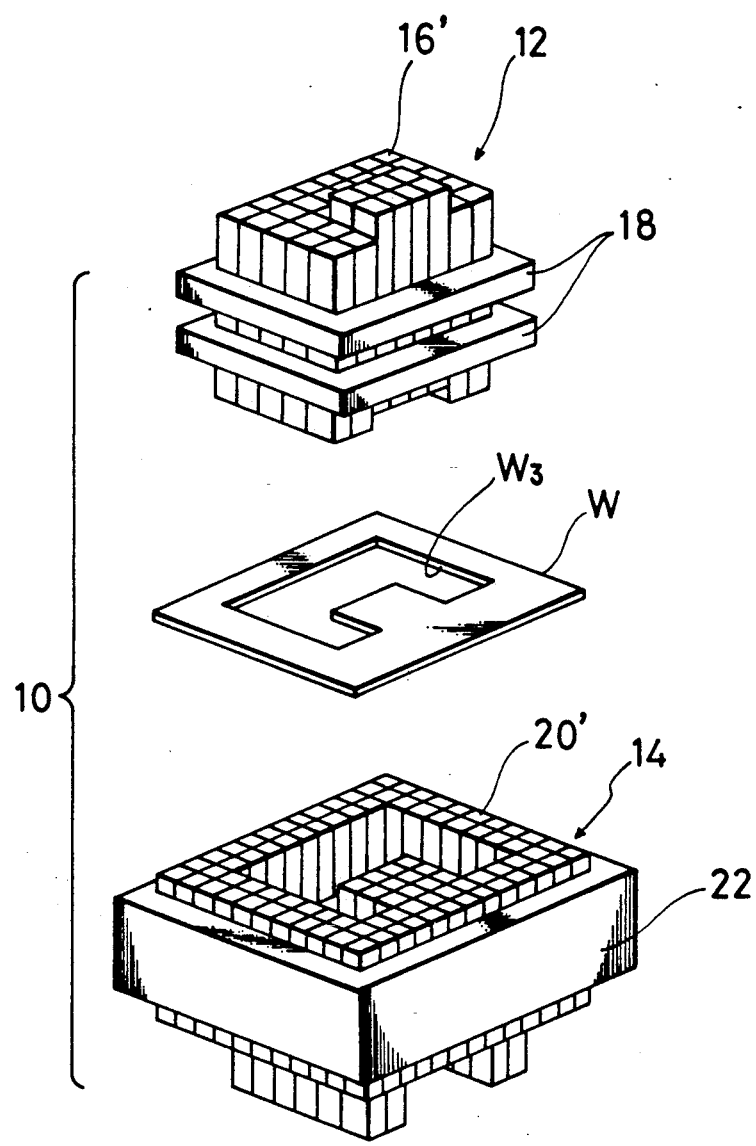

For example, in the above-described embodiment, the shaping mold apparatus 10 has been described as being used as a mold apparatus for the drawing work, whereas the present invention is not restricted to such an application, but is equally applicable to a punching mold apparatus. In such case, the die members 16 or 20 are replaced by punch members 16' or 20' of a similar shape whose lower end peripheral edges function as cutting edges, and when, for example, punching a metal plate W as a workpiece by a U-shaped opening W3 as shown in FIG. 8, setting is made so that in the upper mold 12, the punch members 16' corresponding to this punched shape are partly protruded downwardly and in the lower mold 14, the punch members 20' corresponding to the protruded punch members 16' are protruded downwardly. In this manner, this mold apparatus becomes usable also as a punching mold.

As described above in detail, the variable mold apparatus according to the present invention is a variable mold apparatus for molding a plate-like member so as to have a recess of a predetermined shape, and is characterized by the provision of a plurality of rod-like die members disposed so as to be capable of being protruded, and protrusion amount control means for controlling the amount of protrusion of each of these die members so as to form the predetermined shape of said recess.

Also, in the variable mold apparatus according to the present invention, the protrusion amount control means is characterized by the provision of a robot provided with an x-axis arm movable along the x-axis and a y-axis arm movable along the y-axis, an engagement member mounted on the x-axis or the y-axis of the robot and movable along the direction of the z-axis and selectively engageable with individual die members from above, and prescribing means for prescribing the amounts of movement in the x-y plane and the amounts of protrusion along the direction of the z-axis, of the arms of the robot.

Thus, according to the present invention, there is provided a variable mold apparatus which is inexpensive and moreover can shorten the time for designing and making the mold.

The construction of a second embodiment of the variable mold apparatus according to the present invention will hereinafter be described in detail with respect to a case where it is applied to a shaping mold apparatus, with reference to FIGS. 9 to 12.

Figure 9:
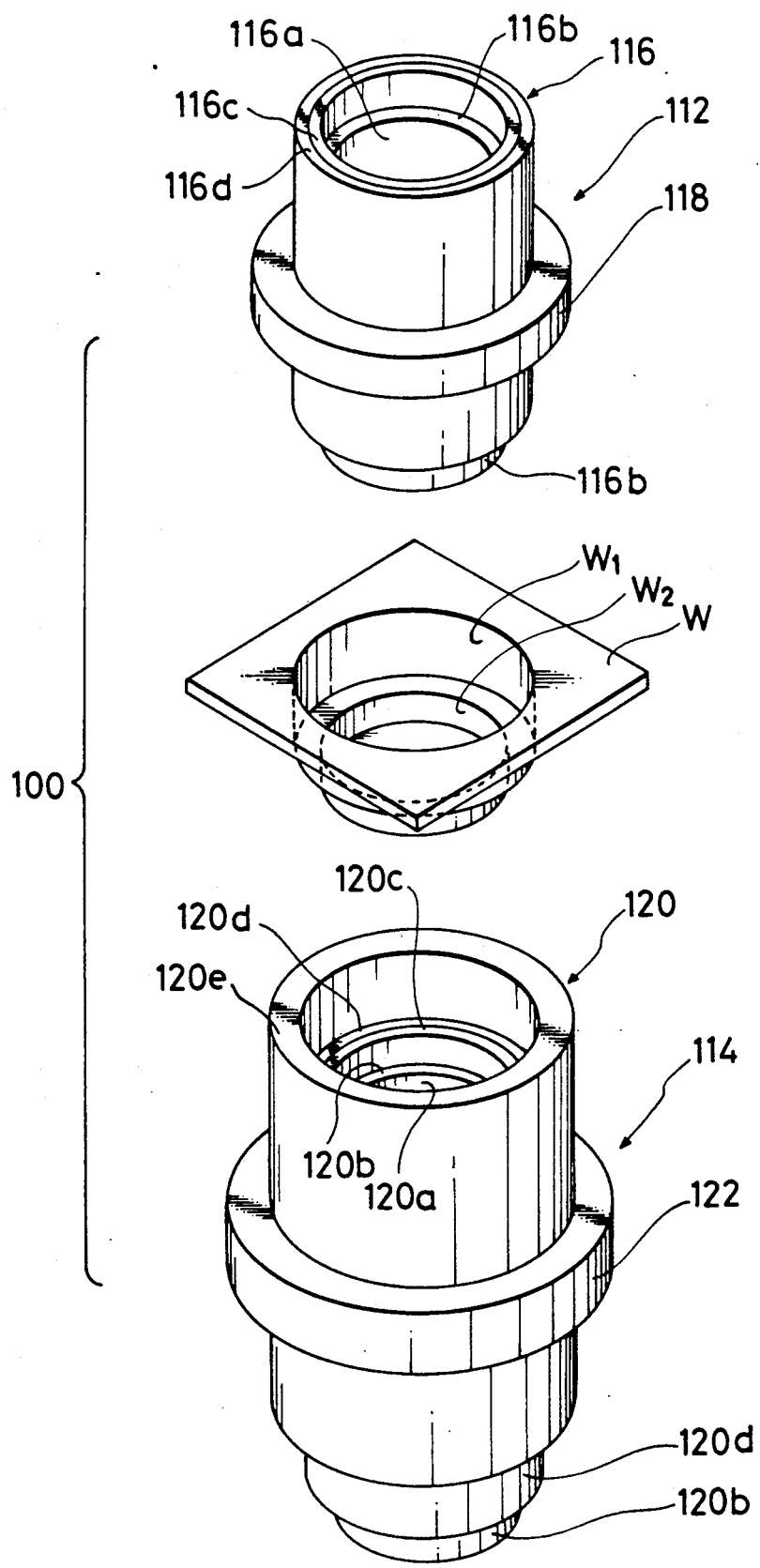
FIG. 9 is an exploded perspective view showing the construction of another embodiment of the variable mold apparatus according to the present invention.

This shaping mold apparatus 100 is an apparatus for draw-working a plate of a metal or plastic resin, and is provided with an upper mold 112 and a lower mold 114, as shown in FIG. 9. This shaping mold apparatus 100 is constructed so as to draw-work a workpiece designated by the reference character W from a planar plate of plastic resin or a metal so as to partly have a deeply drawn portion. In this embodiment, the draw-worked shape is set, as shown by the workpiece W, so as to have a large-diametered circular first recess $W_1$ directly formed in the surface of the plate, and a small-diametered circular second recess $W_2$ formed so as to be further depressed from the central portion of the first recess $W_1$. That is, the shape of the recess that can be formed in this embodiment is limited to concentric circles.

On the other hand, the upper mold 112 is provided with a die member 116 divided into a plurality, and this die member 116 is constructed into a concentric circular shape by a bottomed pillar-like core body 116a extending along a vertical direction as viewed in FIG. 9, and a plurality of (in this embodiment, three) hollow cylinder bodies 116b, 116c, 116d successively fitted to the outer periphery of the core body 116a. Here, the core body 116a and the plurality of hollow cylinder bodies 116b, 116c, 116d are such that adjacent ones of them are slidable relative to each other and capable of protruding downwardly.

In this embodiment, the core body 116a and the first hollow cylinder body 116b are integrally protruded downwardly to define the second recess W2, and the remaining hollow cylinder bodies 116c and 116d are set so as to directly define the first recess W1. In a state in which the core body 116a and the first hollow cylinder body 116b are thus protruded, the core body 116a and the plurality of hollow cylinder bodies 116b, 116c and 116d are set so as to be generally fastened by a fixing guide 118 for the upper mold and have their shown protruded shapes fixed.

Also, the lower mold 114, like the upper mold 112, is provided with a die member 120 divided into a plurality, and this die member 120 is concentrically comprised of a core body 120a formed into a pillar-like shape having its upper surface closed and extending along a vertical direction, and a plurality of (in this embodiment, four) hollow cylinder bodies 120b, 120c, 120d, 120e successively fitted to the outer periphery of the core body 120a. The core body 120a and the plurality of hollow cylinder bodies 120b, 120c, 120d, 120e are such that adjacent ones of them are slidable relative to each other and capable of protruding downwardly. In this embodiment, the outermost hollow cylinder body 120e is positioned as a base end portion having an upper surface wider than the die member 116 of the upper mold 112.

Also, these die members 120 are set so that in the state in which they are partly protruded as shown, the die members 120 are generally fastened by a fixing guide 122 for the lower mold and have their shown protruded shapes fixed.

These die members 116 and 120 are formed with slits of predetermined lengths along their axial direction so that although not shown, in the die member 116, the slit may open at its upper end and in the die member 120, the slit may open at its lower end, in order to enable the die members to be fastened by the corresponding fixing guides 118 and 122 and their protruded shapes fixed.

The upper mold 112 and the lower mold 114 are constructed as described above and therefore, in this embodiment, setting is made so as to draw-work a depressed shape having two stages of concentric recesses W1 and W2, but it becomes possible to change and set the shape to any concentric depressed shape and it becomes possible to cope with a variety of shapes by this pair of upper mold 112 and lower mold 114.

As a result, in this embodiment, the mold shaping cost may be low and the mold shaping time is shortened and thus, a situation in which the shaping of the mold is not in time for the manufacture of products is reliably avoided.

Figure 10:
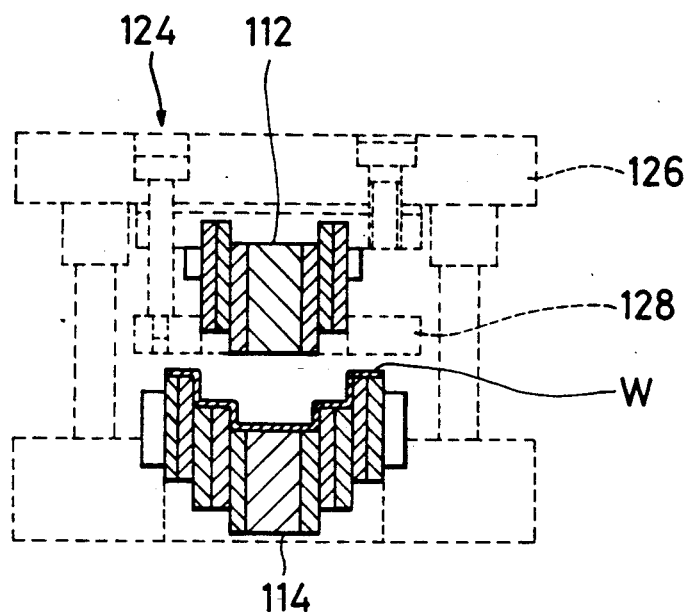
FIG. 10 is a front cross-sectional view schematically showing the construction of a press die set on which the variable mold apparatus shown in FIG. 9 is mounted.

The thus constructed upper mold 112 and lower mold 114 are mounted on a press die set 124 shown in FIG. 10, thereby being used for the shaping operation.

That is, this press die set 124 is comprised of a die set 126 and a stripper plate 128.

Thus, when effecting the drawing work in this press die set 124, a planar metal plate W is inserted between the upper mold 112 and the lower mold 114, and is fixed onto the upper surface of the lower mold 114 through fixing means, not shown. By applying a downwardly directed load to the upper mold 112 by a drive source, not shown, the upper mold 112 works and the metal plate W as a workpiece is draw-worked. FIG. 10 shows the state at a point of time whereat the drawing work has been terminated.

The present invention is not restricted to the construction of the above-described embodiment, but of course may be modified variously within a scope which does not depart from the gist of the present invention.

Figure 11:
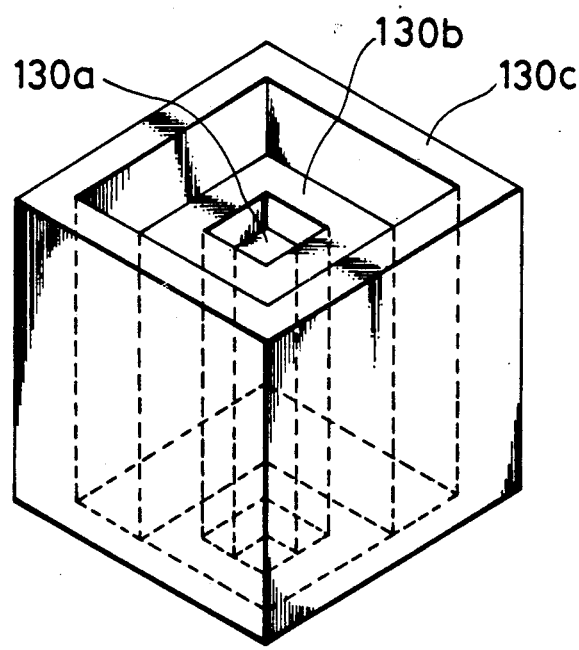
FIG. 11 is an exploded perspective view showing a state in which the variable mold apparatus shown in FIG. 9 is used as a punching mold.
Figure 12:
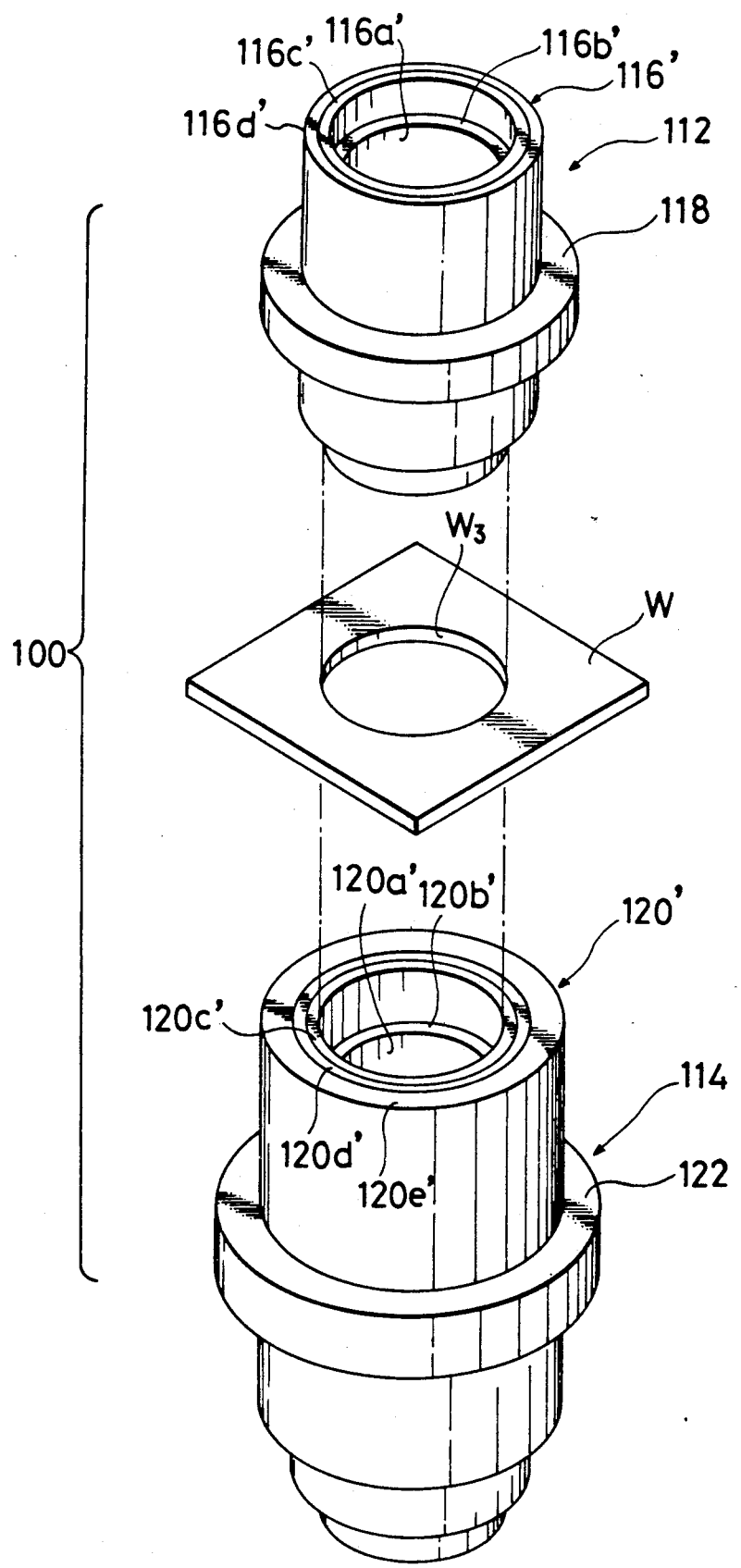
FIG. 12 is a perspective view schematically showing the construction of still another embodiment of the variable mold apparatus according to the present invention.
Figure 13:
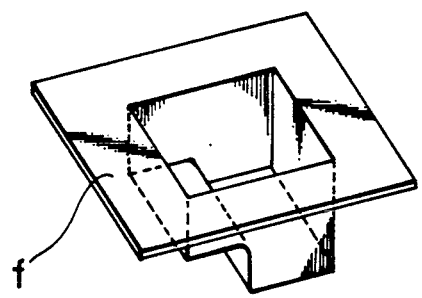
FIG. 13 is a perspective view showing the drawn shape of a workpiece in the prior art.
Figure 14:
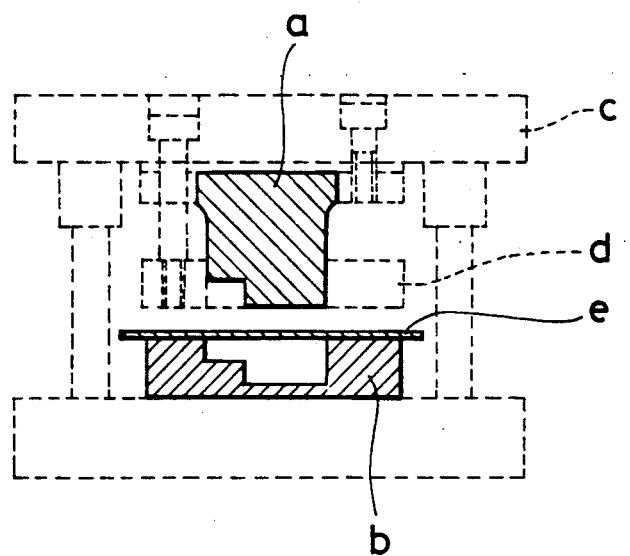
FIG. 14 is a front cross-sectional view schematically showing the construction of a drawing apparatus for a workpiece in the prior art.

For example, in the above-described embodiment, this shaping mold apparatus 100 has been described as being used as a mold apparatus for the drawing work, whereas the present invention is not restricted to such an application, but is equally applicable to a punching mold apparatus. In such case, the die members 116 and 120 replaced by punch members 116′ and 120′ of a similar shape whose end peripheral edges function as cutting edges, and when, for example, punching a meral plate W as a workpiece by a circular opening W3 as shown in FIG. 11, setting is made so that in the upper mold 112, the punch members 116′ corresponding to this punched shape are partly protruded downwardly and in the lower mold 114, the punch members 120′ corresponding to the protruded punch members 116′ are protruded downwardly. In this manner, this mold apparatus becomes usable also as a punching mold which can cope with various sizes.

Also, in the above-described embodiment, the core bodies 116a, 120a and the plurality of hollow cylinder bodies 116b, 116c, 116d; 120b, 120c, 120d, 120e which constitute the respective die members 116 and 120 have been described as forming concentric circular shapes, whereas the present invention is not restricted to such a construction, but as shown as another embodiment, for example, in FIG. 11, they may be comprised of a plurality of concentric post bodies 130a, 130b, . . . , instead of a concentric circular shape.

As described above in detail, the variable mold apparatus according to the first embodiment of the present invention is a variable mold apparatus for molding a plate-like member so as to have a recess of a predetermined shape, and is characterized by the provision of a core body formed so as to extend along one direction, at least one hollow cylinder body fitted to the outer periphery of the core body and disposed so as to be capable of protruding along said one direction relative to said core body, and fixing means for fixing at least one of said core body and said cylinder body in its protruding state.

The variable mold apparatus according to the second embodiment of the present invention is a variable mold apparatus for punching a plate-like member so as to have an opening of a predetermined size, and is characterized by the provision of a first punch member formed so as to extent along one direction, at least one hollow cylindrical second punch member fitted to the outer periphery of the first punch member and disposed so as to be capable of protruding along said one direction relative to said first punch member, and fixing means for fixing at least one of said first and second punch members in its protruding state.

Thus, according to the present invention, there is provided a variable mold apparatus which is inexpensive and moreover can shorten the working time.

What is claimed is:

1. A mold forming apparatus capable of varying a mold shape, comprising:
   a first molding member having a plurality of bar-shaped die members arranged in a body and disposed in a matrix state in X and Y directions;
   a second molding member having a plurality of bar-shaped die members arranged in a body and disposed in a matrix state in X and Y directions;
   depressing means for vertically depressing, in accordance with a predetermined sequence, predetermined bar-shaped materials in said first molding member, wherein said first and second molding members are vertically aligned such that depressing said predetermined bar-shaped members in said first molding member also depresses a corresponding bar-shaped member in said second molding member, and said first and second molding members are depressed based on their X and Y position in the matrix;
   fixing means for fixing said bar-shaped members of said first and second molding members after said predetermined bar-shaped members of said first molding member are depressed;
   shifting means for shifting said depressing means; and
   control means for controlling said shifting means in the X and Y directions in accordance with the predetermined sequence.

2. A mold forming apparatus according to claim 1, wherein said fixing means includes first fastening means extending along a plurality of sides of said body of bar-shaped die members, second fastening means contacting at least one side of said body of bar-shaped die members and having a portion slidably contacting said first fastening means, and means for abutting said first and second fastening means.

3. An apparatus controlling a protruding amount of bar-shaped die members, comprising:
   a first molding member having a plurality of bar-shaped die members arranged in a body and disposed in a matrix state along X and Y axes;
   a second molding member having a plurality of bar-shaped die members arranged in a body and disposed in a matrix state along X and Y axes;
   jig means for maintaining said bar-shaped die members of said first and second molding members in substantially the same vertical plan;
   means for depressing said bar-shaped die members in said first molding member;
   means for moving said depressing means along the X and Y axes; and
   means for determining a depression amount of said bar-shape die members by controlling said depressing means.

4. An apparatus according to claim 3, wherein said bar-shaped die members of said first molding member each include a connecting rod and a head coaxially extending from a top surface thereof, and said moving means moves said depressing means to depress said heads in said first molding member to form a recess portion in a workpiece which serves as a container of articles.

5. An apparatus according to claim 4, wherein said heads have a larger diameter than said connecting rods, and said moving means moves said depressing means to form a first group of bar-shaped die members which are not vertically disposed and a second group of bar-shaped die members whose vertical depression amount is larger than that of said first group, with a first recess portion being formed in the workpiece by said first group and a second recess portion being formed in the first recess portion by said second group.

6. A mold apparatus, comprising:
a first mold having a plurality of coaxially disposed cylindrical members and having a first fixing member for fixing said cylindrical members;
a second mold having a plurality of coaxially disposed cylindrical members and having a second fixing member for fixing said cylindrical members;
means for aligning said first and second molds in the same vertical plane and vertically depressing each cylindrical member of said first mold to a predetermined depressed portion, with said cylindrical members of said second mold formed to have a complementary shape with said cylindrical members of said first mold; and
fixing means for fixing said cylindrical members of said first and second molds at the depressed portion.

7. A mold apparatus according to claim 6, wherein said cylindrical members of said first and second molds comprise a core member at a center portion thereof.

8. A mold apparatus according to claim 6, wherein said first fixing means is concentrically disposed around said first mold, and said aligning means vertically depresses said cylindrical members to form a recess portion in a workpiece for containing articles.

9. A mold apparatus according to claim 8, wherein said second fixing means is concentrically disposed around said second mold, and said aligning means vertically depresses said cylindrical members in varying amounts to form recesses of multiple levels.

* * * * *

UNITED STATES PATENT AND TRADEMARK OFFICE
CERTIFICATE OF CORRECTION

PATENT NO. : 5,192,560
DATED : March 9, 1993
INVENTOR(S) : Sachio Umetsu, et al.

It is certified that error appears in the above-indentified patent and that said Letters Patent is hereby corrected as shown below:

COLUMN 9:

Line 65, "extent" should read --extend--.

COLUMN 10:

Line 59, "bar-shape" should read --bar-shaped--.
Line 53, "plan;" should read --plane;--.

Signed and Sealed this

Fifteenth Day of March, 1994

Attest:

BRUCE LEHMAN

Attesting Officer        Commissioner of Patents and Trademarks